(12) United States Patent  (10) Patent No.: US 7,509,808 B2
Storey et al.  (45) Date of Patent: Mar. 31, 2009

(54) APPARATUS HAVING THERMALLY ISOLATED VENTURI TUBE JOINTS

(75) Inventors: James M Storey, Taylors, SC (US); Constantin Dinu, Greer, SC (US)

(73) Assignee: General Electric Company, Schenectady, NY (US)

( * ) Notice: Subject to any disclaimer, the term of this patent is extended or adjusted under 35 U.S.C. 154(b) by 726 days.

(21) Appl. No.: 10/907,248

(22) Filed: Mar. 25, 2005

(65) Prior Publication Data

US 2006/0213178 A1 Sep. 28, 2006

(51) Int. Cl.
F02C 1/00 (2006.01)
F02G 3/00 (2006.01)
(52) U.S. Cl. .......................... 60/740; 60/747
(58) Field of Classification Search ........... 60/740, 60/742, 733, 747
See application file for complete search history.

(56) References Cited

U.S. PATENT DOCUMENTS

| 4,047,877 | A | | 9/1977 | Flanagan | 431/8 |
|---|---|---|---|---|---|
| 4,107,918 | A | * | 8/1978 | Andrew et al. | 60/737 |
| 4,226,087 | A | * | 10/1980 | Spadaccini | 60/749 |
| 4,356,698 | A | * | 11/1982 | Chamberlain | 60/733 |
| 4,534,165 | A | | 8/1985 | Davis, Jr. et al. | 60/39.02 |
| 4,845,952 | A | | 7/1989 | Beebe | 60/737 |
| 4,966,001 | A | | 10/1990 | Beebe | 60/737 |
| 5,161,366 | A | * | 11/1992 | Beebe | 60/777 |
| 5,826,429 | A | * | 10/1998 | Beebe et al. | 60/723 |
| 5,850,731 | A | * | 12/1998 | Beebe et al. | 60/778 |
| 6,267,585 | B1 | * | 7/2001 | Suttrop | 431/354 |
| 6,442,939 | B1 | * | 9/2002 | Stuttaford et al. | 60/737 |
| 6,460,345 | B1 | * | 10/2002 | Beebe et al. | 60/777 |
| 6,829,896 | B2 | * | 12/2004 | Bruck et al. | 60/723 |
| 6,983,600 | B1 | * | 1/2006 | Dinu et al. | 60/737 |
| 6,996,990 | B2 | * | 2/2006 | Dinu | 60/723 |
| 7,003,958 | B2 | * | 2/2006 | Dinu et al. | 60/737 |
| 7,007,478 | B2 | * | 3/2006 | Dinu | 60/737 |
| 7,093,438 | B2 | * | 8/2006 | Dinu et al. | 60/737 |
| 7,104,750 | B2 | * | 9/2006 | Bolis et al. | 415/116 |
| 2006/0213178 | A1 | * | 9/2006 | Storey et al. | 60/39.465 |

* cited by examiner

*Primary Examiner*—William H Rodriguez
(74) *Attorney, Agent, or Firm*—Cantor Colburn LLP (57) ABSTRACT

A gas fuel injector includes a first header plate, a second header plate, and a plurality of venturi tubes. The second header plate is spaced downstream from the first header plate. The plurality of venturi tubes is sealably secured to the first and second header plates. Each venturi tube of the plurality of venturi tubes is defined by a plurality of fixable components.

20 Claims, 6 Drawing Sheets

APPARATUS HAVING THERMALLY ISOLATED VENTURI TUBE JOINTS

BACKGROUND OF THE INVENTION

The present disclosure relates to a gas fuel injector for a combustor in an engine. More specifically, the present disclosure relates to the joints of a venturi tube in the gas fuel injector.

A present thrust of gas-turbine engine technology seeks to attain reduced emissions of nitrogen (NOx) and hydrocarbon compounds. Prior-art techniques for accomplishing such reduced emissions almost invariably result in reduced thermodynamic efficiency or substantially increased capital costs.

NOx compounds are produced by reaction of the nitrogen in the air at elevated temperatures conventionally reached in the combustors of a gas turbine engine. NOx formation can be reduced by reducing the maximum flame temperature in the combustor. Injection of steam into the combustor reduces the maximum flame temperature in the combustor at the cost of thermodynamic efficiency. Penalties must also be paid in water use, including water treatment capital outlay and operating costs. The amount of steam injection, and its attendant costs, rises with the amount of NOx reduction desired. Some states and foreign countries have announced targets for NOx reduction that infer such large quantities of steam that this solution appears less desirable for future systems.

NOx compounds can be removed from the exhaust downstream of a gas turbine engine by mixing a reagent such as, for example, ammonia, with the exhaust stream and passing the resulting mixture through a catalyst before venting to the atmosphere. The catalyst encourages the reaction of the NOx compounds with the reagent to produce harmless components. This technique, although successful in reducing NOx compounds to target levels, requires substantial additional capital outlay for the catalyst bed, a larger exhaust system to provide room for the large catalyst bed, and spray bars to deliver the reagent into the exhaust stream. The on-going cost of large quantities of the reagent must also be borne.

The maximum flame temperature can be reduced without steam injection using catalytically supported combustion techniques. For example, a fuel-air mixture is passed through a porous catalyst within the combustor. The catalyst permits complete combustion to take place at temperatures low enough to avoid NOx formation. Several U.S. patents, such as, for example, U.S. Pat. Nos. 4,534,165 and 4,047,877, illustrate combustors having catalytically supported combustion.

Reduction or elimination of hydrocarbon emissions is attainable by ensuring complete combustion of the fuel in the combustor. Complete combustion requires a lean fuel-air mixture. As the fuel-air mixture is made leaner, a point is reached at which combustion can no longer be supported. The presence of a catalyst also permits combustion of leaner fuel-air mixtures than is possible without the catalyst. In this way, catalytically supported combustion aids in reducing both types of environmental pollution (e.g., NOx and hydrocarbons).

Placing a series of venturi tubes upstream of the catalyst may ensure fuel and air are thoroughly mixed in an efficient way. One problem, not completely solved by the referenced prior-art patents, is that thermal stresses are applied to the structural joints that attach each of the venturi tubes within the injector. Thermal stress to structural joints may cause cracks in the joints before the normal service interval. This reduces the service life of the injector causing increased maintenance costs and a decreased operational reliability.

Venturi tubes are typically brazed to the header plates, and the perimeters of the header plates are sealed to form a plenum into which pressurized gaseous fuel is supplied. The braze joints of the venturi tubes are normally exposed to cold flow from the fuel on one side and hot air flow on the other inducing a cyclic stress. Thus, it is desirable to thermally isolate the braze joints and thereby increase the service life of the injector.

BRIEF DESCRIPTION OF THE INVENTION

Exemplary embodiments of the invention include a gas fuel injector. The gas fuel injector includes a first header plate, a second header plate, and a plurality of venturi tubes. The second header plate is spaced downstream from the first header plate. The plurality of venturi tubes is sealably secured to the first and second header plates. Each venturi tube of the plurality of venturi tubes is defined by a plurality of fixable components.

Further exemplary embodiments of the invention include a combustor for a gas turbine engine. The combustor includes a preburner and a fuel injector downstream of the preburner. The gas fuel injector includes a first header plate, a second header plate, and a plurality of venturi tubes. The second header plate is spaced downstream from the first header plate. The plurality of venturi tubes is sealably secured to the first and second header plates. Each venturi tube of the plurality of venturi tubes is defined by a plurality of fixable components.

The above, and other objects, features and advantages of the present invention will become apparent from the following description read in conjunction with the accompanying drawings, in which like reference numerals designate the same elements.

BRIEF DESCRIPTION OF THE DRAWINGS

Referring now to the drawings wherein like elements are numbered alike in the several FIGURES.

DETAILED DESCRIPTION OF THE INVENTION

A typical gas turbine engine employs a plurality of parallel combustors disposed in a circle about an axis thereof. A fuel-air mixture is burned in each combustor to produce a hot, energetic flow of gas. The gas from each combustor travels through a transition piece wherein the gas flow is changed from a generally circular field to a field approximating an arc of a circle. The outlets of all of the transition pieces are arranged to form a full circle leading to turbine blades of the machine. All of the above is conventional and does not require further description to enable a full understanding by one skilled in the art. Accordingly, attention is focused in the remainder of the present description on a single combustor, it being understood that all combustors in a gas turbine engine are substantially identical to the one described. Only those additional portions of a gas turbine engine required for an understanding of the environment in which the combustor operates are shown and described.

Figure 1:
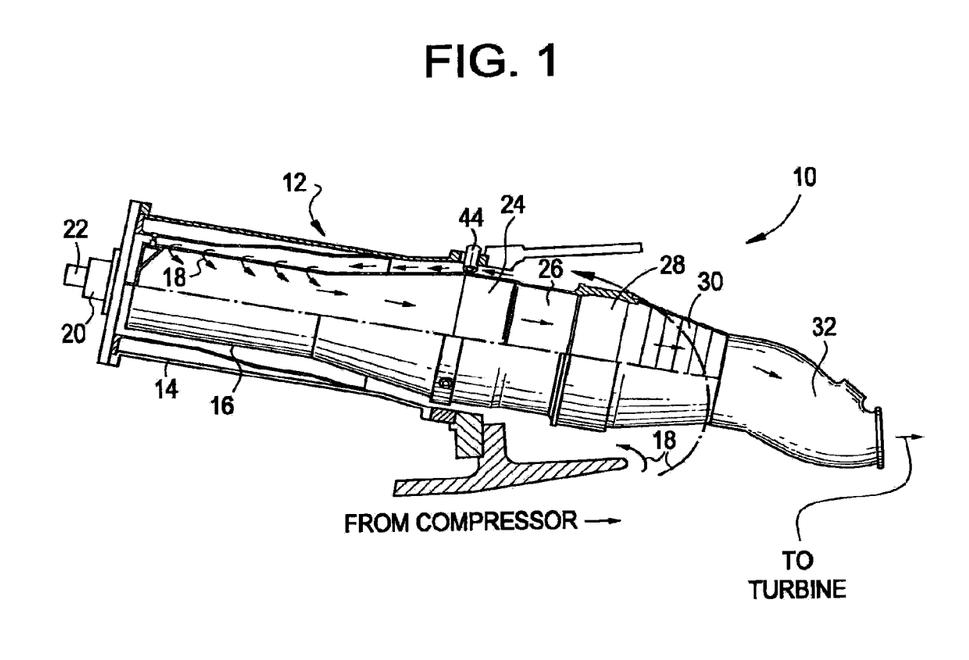
FIG. 1 is a side view, partly in cross section, of a portion of a gas turbine engine showing a combustor with a multiple-venturi tube gas fuel injector.

Referring to FIG. 1, there is shown, generally at 10, a gas turbine engine having a combustor assembly 12 according to an exemplary embodiment of the invention. A preburner section 14 receives air 18 for combustion and dilution through a preburner liner 16. During startup, a preburner fuel nozzle 20 receives a flow of fuel from a fuel line 22 for combustion in preburner section 14. Under more fully loaded conditions of gas turbine engine 10, fuel may be cut off from preburner fuel nozzle 20.

The air and products of combustion in preburner section 14 flow through a multiple-venturi tube gas fuel injector 24 in which additional fuel is added to the flow field before it passes into a fluid momentum mixing section 26. As will be further detailed, multiple-venturi tube gas fuel injector 24 includes a plurality of parallel venturi tubes (not shown) to enhance vigorous mixing of air and added fuel. The mixture entering fluid momentum mixing section 26 from the plurality of venturi tubes is further mixed together as it travels along fluid momentum mixing section 26 until it reaches a catalyst bed 28. As the fuel-air mixture passes through catalyst bed 28, a combustion reaction takes place, catalyzed by catalyst material in catalyst bed 28. The resulting hot, energetic gasses exiting catalyst bed 28 pass through a reaction zone 30 before being turned and shaped in a transition piece 32 for delivery to a turbine (not shown). Although the combustor of this exemplary embodiment has a catalyst bed 28, it should be noted that the present disclosure is also envisioned for use in a non-catalytic combustor.

The length and shape of preburner section 14 depends on the type of fuel to be used for preburner heating. The embodiment shown is suitable for use with natural gas in preburner fuel nozzle 20. This should not be taken to exclude the use of other gaseous fuels, liquid fuels or combinations of gaseous and liquid fuels in preburner section 14. If such other fuels are used in preburner section 14, one skilled in the art would recognize that suitable modifications in, for example, shape and dimensions, are required to accommodate them.

Figure 2:
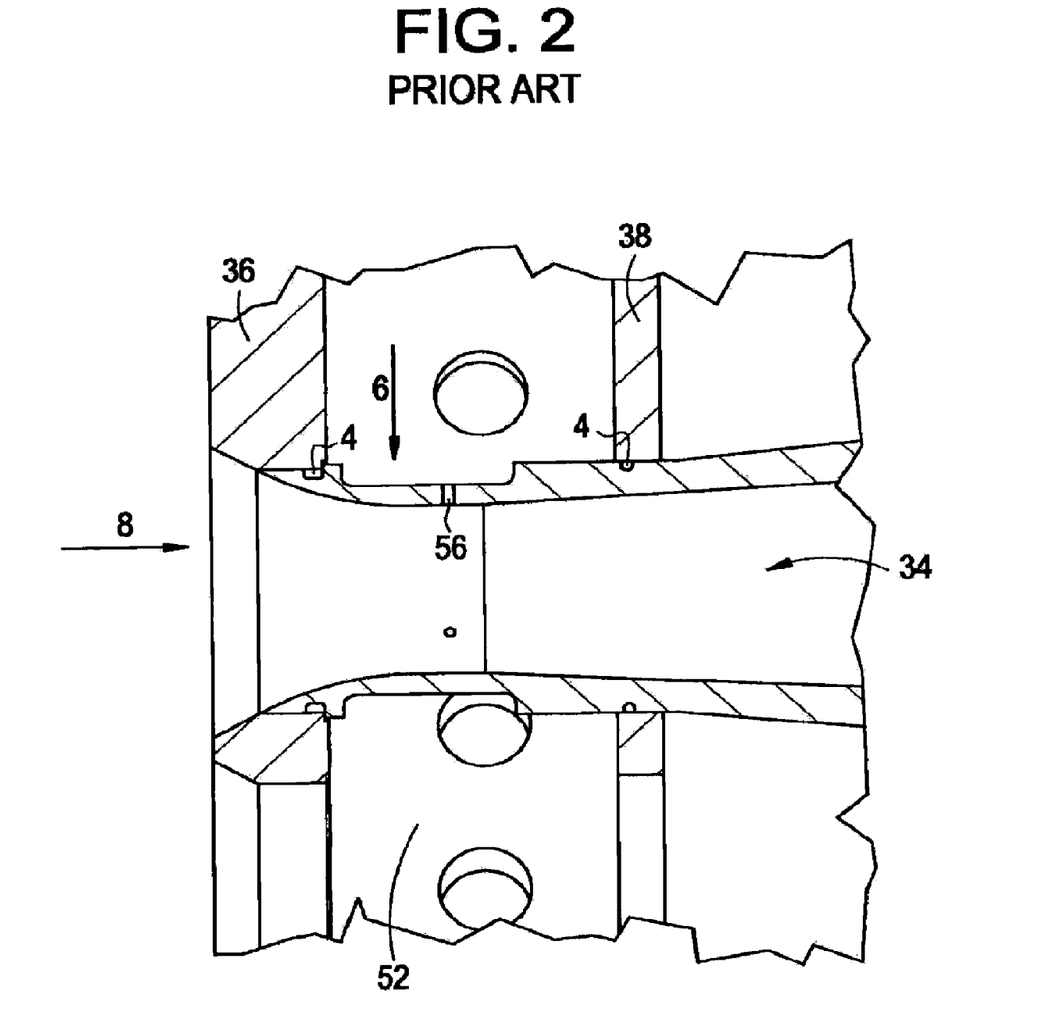
FIG. 2 is a partial cross-section view of a conventional one-piece venturi tube affixed between header plates.

FIG. 2 illustrates a venturi known in the prior art, including braze joints 4 which mechanically fix a venturi tube 34 in relation to a fuel gas plenum 52 between a first header plate 36 and a second header plate 38. A cold fuel flow 6 travels over one side of the braze joints 4 from a fuel gas plenum 52 through gas injection holes 56 into each venturi tube 34. The braze joints 4 are also exposed to a hot air flow 8 from the preburner section 14 thus inducing a thermal gradient across the joints which, due to a geometric configuration of the joints results in high thermal stresses during combustor operation.

Figure 3:
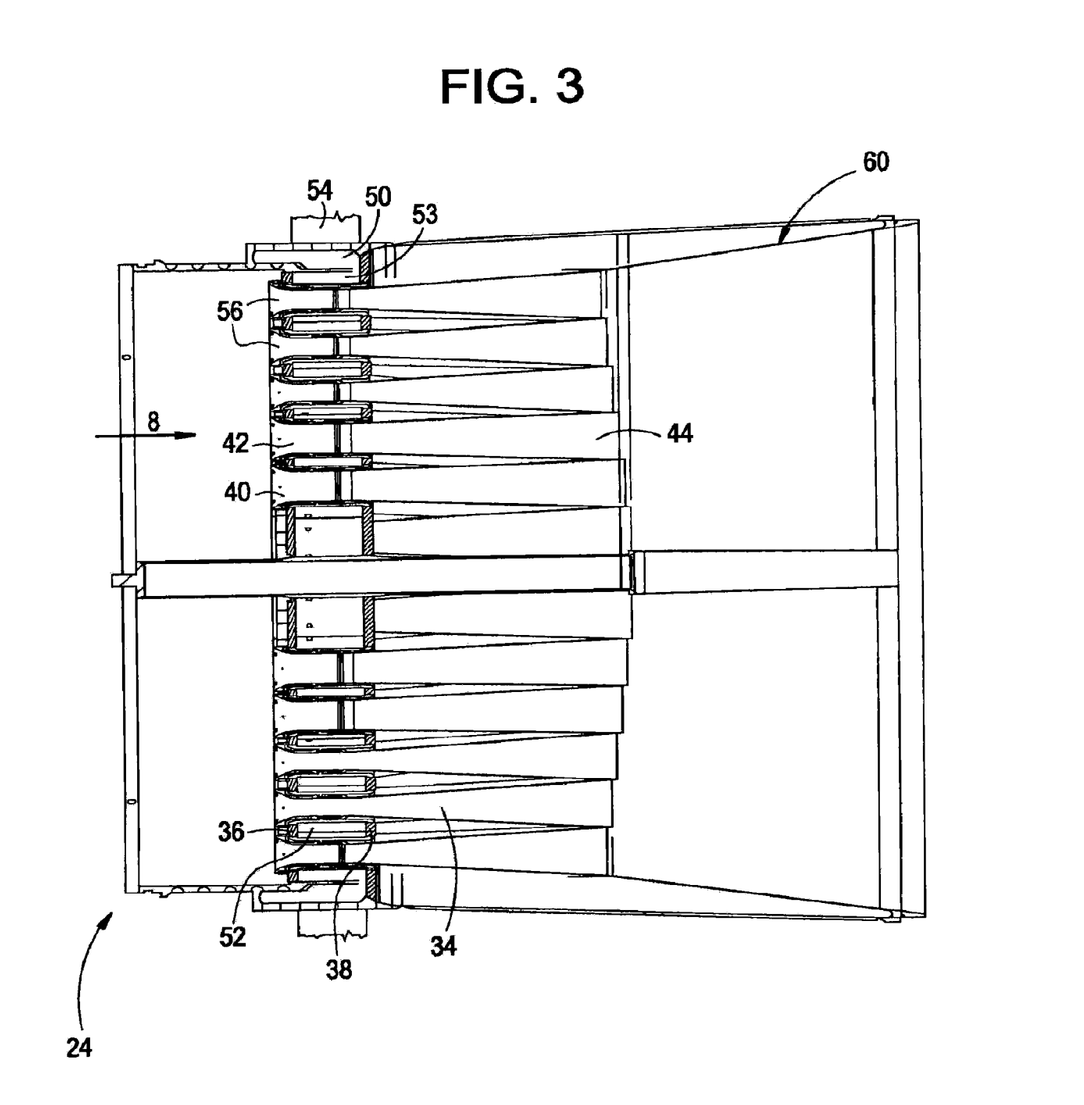
FIG. 3 is a cross-section view of the multiple-venturi tube gas fuel injector of FIG. 1.

FIG. 3 illustrates the multiple-venturi tube gas fuel injector 24, which includes a plurality of venturi tubes 34. Each venturi tube 34 is sealably affixed to an upstream header plate 36. A downstream header plate 38 is spaced downstream from upstream header plate 36 and is also sealably affixed to each venturi tube 34. The upstream and downstream header plates 36 and 38, respectively, are sealably affixed to the venturi tubes 34 by brazing or any other suitable method of attachment. Each venturi tube 34 has an inlet region 40, a throat region 42, and an exit region 44. A manifold 50, which is sealed about the perimeters of upstream header plate 36 and downstream header plate 38. The manifold 50 forms a sealed fuel gas plenum 52 between upstream and downstream header plates 36 and 38, about the perimeters of each venturi tube 34. Gaseous fuel, under pressure, is fed to fuel gas plenum 52 through a fuel gas supply line 54 into manifold 50 and then into fuel gas plenum 52 through a circumferential gap 53 which acts to evenly distribute the fuel flow supply to fuel gas plenum 52. In an exemplary embodiment, there are four gas supply lines 54 (only one is shown), which are evenly spaced around injector 24. Fuel from the fuel gas plenum 52 begins entry into each venturi tube 34 through a hole 56.

Figure 4:
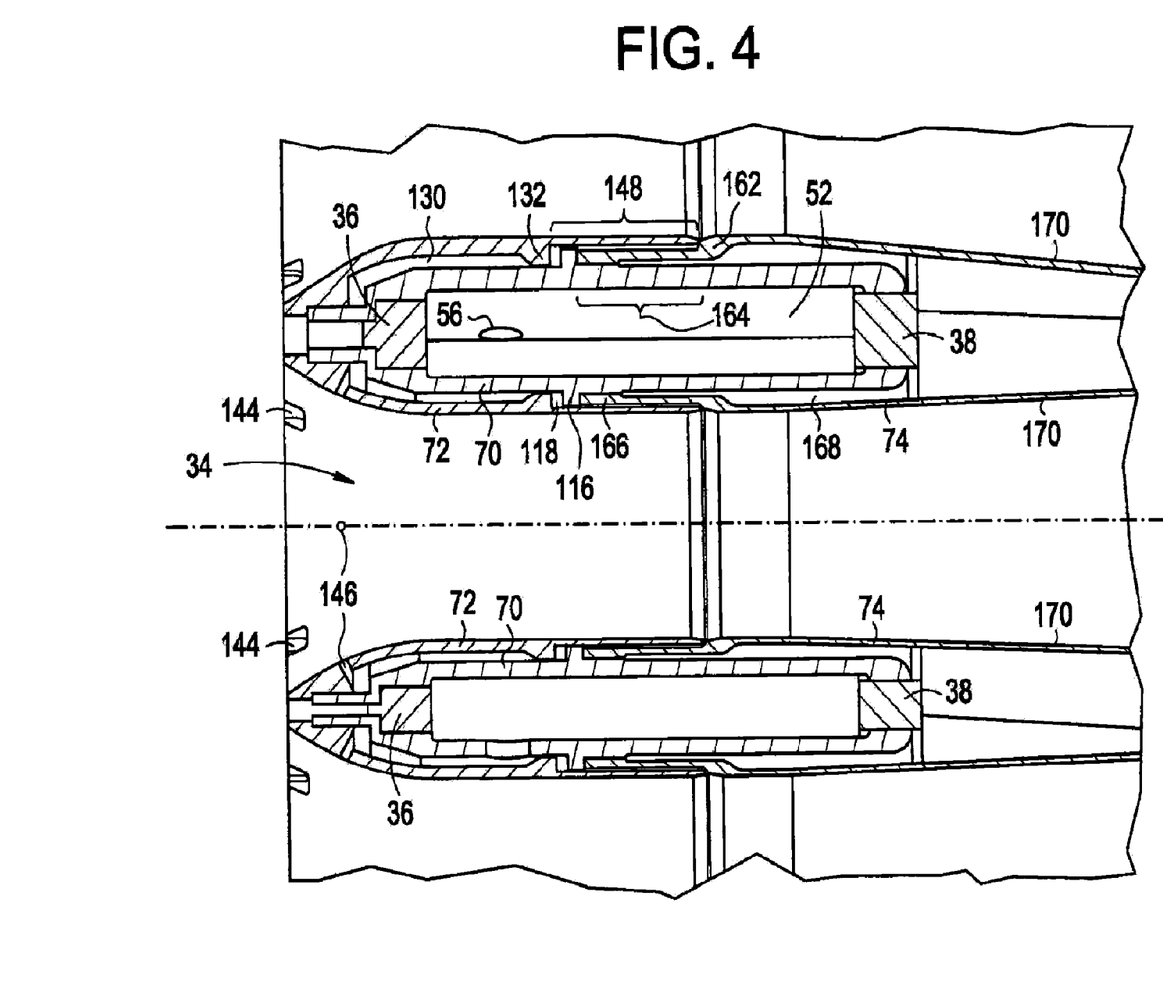
FIG. 4 is a cross section view showing half of a venturi tube attached to header plates and portions of contiguous venturi tubes.

FIG. 4 shows an exemplary embodiment of the present invention in which a venturi tube 34 is defined by a plurality of fixable components. The plurality of fixable components includes components capable of separation or removal, independent of one another. The plurality of fixable components includes a venturi body 70, a venturi inlet shield 72, and a venturi exit shield 74. The venturi body 70, the venturi inlet shield 72 and the venturi exit shield 74 are combined to form a venturi tube 34 which has mechanical joints thermally isolated from the hot air flow 8 shown in FIG. 2, thus allowing the mechanical joints to operate at a temperature close to that of the fuel in the fuel gas plenum 52.

Figure 5:
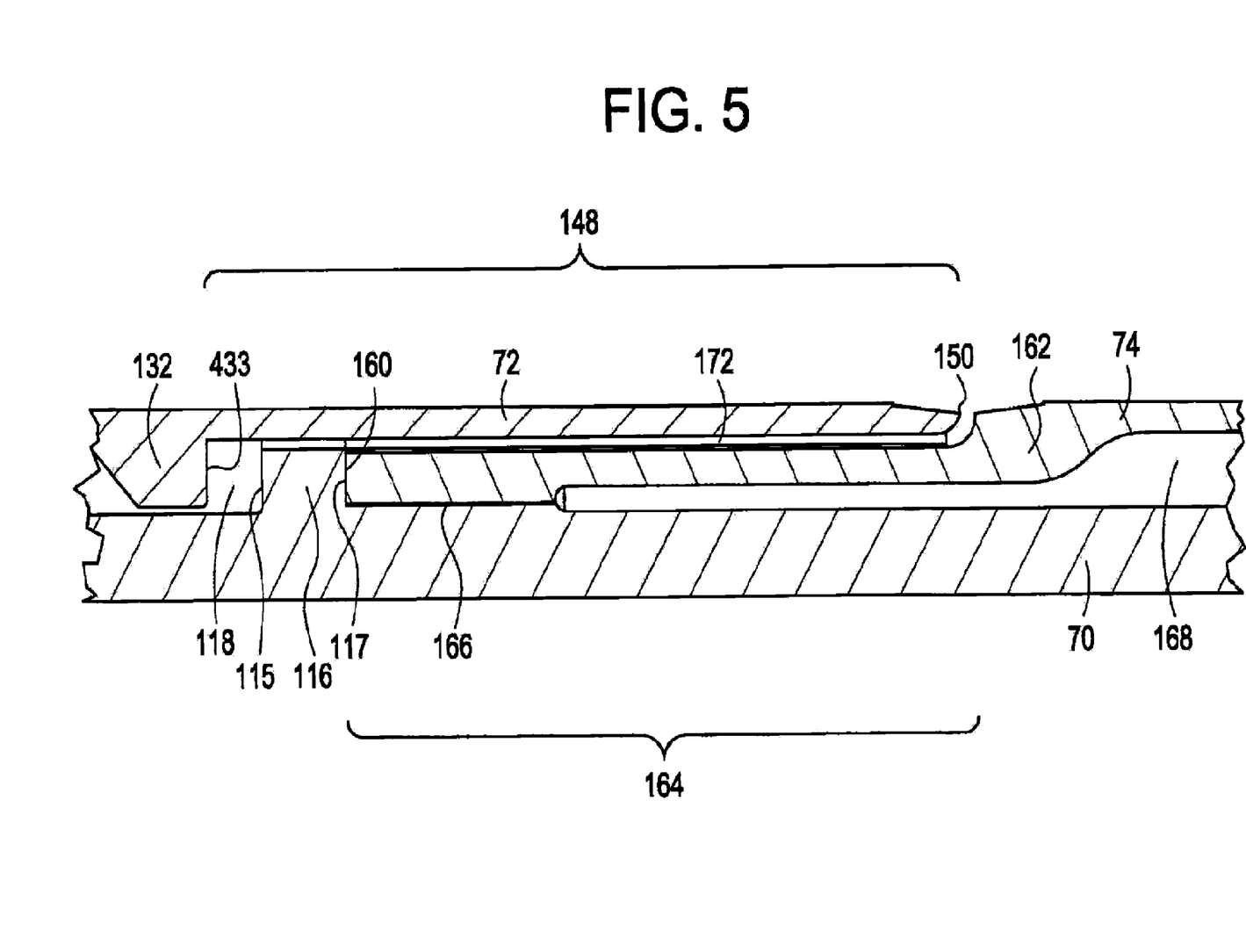
FIG. 5 is an enlarged cross-section view of a center portion of one wall of the venturi tube of FIG. 4.
Figure 6:
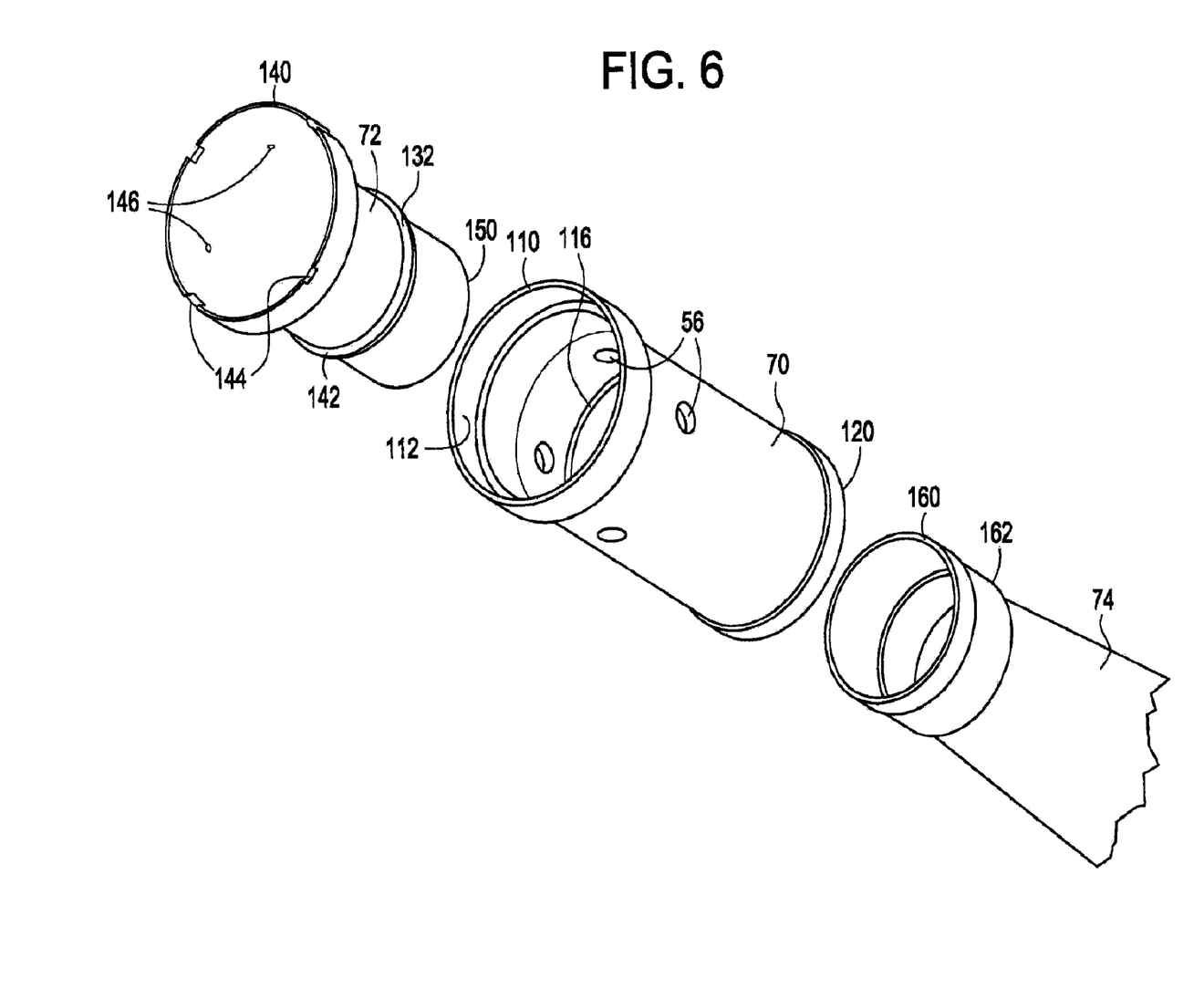
FIG. 6 is a perspective view of the venturi tube of FIGS. 3-5 disassembled.

FIG. 5 shows an enlarged partial cross section view of the venturi tube 34 of FIG. 4. FIG. 6 is a perspective view of the venturi tube 34 used to illustrate how the venturi body 70, the venturi inlet shield 72, and the venturi exit shield 74 combine to form the venturi tube 34.

Referring to FIGS. 3-6, each venturi tube 34 includes the venturi body 70 forming a structural link between upstream and downstream header plates 36 and 38, respectively, the venturi inlet shield 72 disposed from the inlet region 40 to throat 42 region, and the venturi exit shield 74 disposed from the throat region 42 to the exit region 46. Venturi body 70 has a front end 110 and an aft end 120 and is generally cylindrical in shape. Front end 110 and aft end 120 of the venturi body 70 are sealably fixed to upstream and downstream header plates 36 and 38, respectively, by brazing or any other suitable method of attachment to form a sealed mechanical joint. Fuel holes 56 through the cylindrical walls defining the venturi body 70 connect the fuel gas plenum 52 to a mini-fuel plenum 130. An interior surface of the front end 110 is threaded to create a first threaded section 112. A sealing ring 116 is disposed near a middle portion of the venturi body 70. Sealing ring 116 is an annular shaped protrusion formed on an interior surface defining the venturi body 70. Sealing ring 116 has two opposing surfaces disposed substantially perpendicular to the interior surface defining the venturi body 70. A sealing surface 115 is a surface of the sealing ring 116 which faces in a direction from the aft end 120 toward the front end 110. A sealing ring aft surface 117 is a surface of the sealing ring 116 which faces in a direction from the front end 110 toward the aft end 120.

Referring now to FIGS. 4-6, the venturi exit shield 74 has a forward end 160 and a back end 170. Venturi exit shield 74 comprises a front-end portion 164 disposed near the forward end 160. Front-end portion 164 is substantially cylindrical in shape. A diameter of the venturi exit shield 74 is relatively constant over a length defining the front-end portion 164. Front-end portion 164 extends from the forward end 160 to a bent portion or offset section 162 where a diameter of the venturi exit shield 74 is smaller than a diameter of the front-end portion 164. From the bent portion 162, the venturi exit shield 74 extends toward the back end 170 forming an outer wall of the venturi tube 34.

Forward end 160 of the venturi exit shield 74 is inserted into the aft end 120 of the venturi body 70. An exterior surface of the forward end 160 is slidably inserted over an interior surface of the venturi body 70 in a direction from the aft end 120 to the front end 110 until the forward end 160 reaches the sealing ring aft surface 117. A mating joint 166 is established between an exterior surface of the venturi exit shield 74 near the forward end 160 and an interior surface of the venturi body 70 at a position near the sealing ring 116. Mating joint 166 sealably fixes the venturi body 70 to the venturi exit shield 74 by brazing or any other suitable method of attachment. Configuring the mating joint 166 in this manner creates an insulating space 168 between the venturi body 70 and the venturi exit shield 74, which prevents the exposure of the mechanical joint between the venturi body 70 and the downstream header plate 38, to thermal stresses thereby increasing the functional life of the multiple-venturi tube gas fuel injector 24. Additionally, configuring the mating joint 166 in this manner allows the venturi exit shield 74 to grow thermally in all directions in an unrestrained manner with respect to the mating joint 166, which also reduces thermal stresses and increases the functional life of the multiple-venturi tube gas fuel injector 24.

Venturi inlet shield 72 includes a first end 140 and a second end 150, which are both circular in shape. First end 140 forms the inlet of the venturi tube 34 and is circumferentially larger than the second end 150. First end 140 has a plurality of torquing features 144 which are notched recessions equidistantly disposed, for example, at 90 degree intervals around the circumference of the first end 140. A second threaded section 142 is located on an exterior surface of the venturi inlet shield and disposed near the first end 140. Second end 150 is shaped to allow insertion of second end 150 into front end 110 of the venturi body until first and second threaded sections 112 and 142 engage. First and second threaded sections 112 and 142 may be mated together and secured using a device adapted to engage the venturi inlet shield 72 at the torquing features 144 and providing a rotational force thereto. Although venturi inlet shield 72 is threaded to the venturi body 70 using first and second threaded sections 112 and 142 in this embodiment, other suitable means of making a sealed mechanical joint may also be employed.

Still referring to FIGS. 4-6, a mini-fuel plenum sealing ring 132 is disposed near a middle portion of the venturi inlet shield 72. Mini-fuel plenum sealing ring 132 is an annular shaped protrusion extending over the circumference of an exterior surface of the venturi inlet shield 72. A mini-fuel plenum sealing surface 133 forms a sidewall of the mini-fuel plenum sealing ring 132 facing toward the second end 150 of venturi inlet shield 72. Mini-fuel plenum sealing surface 133 is disposed in a direction substantially perpendicular to the exterior surface of the venturi inlet shield 72. Venturi inlet shield 72 also includes a sleeve 148, which defines an interior surface of the venturi inlet shield 72 from the mini-fuel plenum sealing ring 132 to the second end 150. Sleeve 148 extends from the mini-fuel plenum sealing ring 132 to the second end 150 in a direction substantially perpendicular to the mini-fuel plenum sealing surface 133 and isolates the mechanical joint 166 of the exit shield 74 to the venturi body 70 from the hot air flow 8 passing through the venturi tube 34.

Attachment of the venturi body 70 with venturi inlet shield 72 defines the mini-fuel plenum 130. An inner side boundary and an outer side boundary of the mini-fuel plenum 130 are defined by the exterior surface of the venturi inlet shield 72 and the interior surface of the venturi body 70, respectively. A front boundary and a back boundary of the mini-fuel plenum 130 are defined by the first and second threaded sections 112 and 142 and the mini-fuel plenum sealing ring 132, respectively.

Fuel injection holes 146 are disposed between the inlet region 40 and the throat region 42 of the venturi inlet shield 72 to connect the mini-fuel plenum 130 to an interior portion of the venturi tube 34. During operation, fuel enters the gas fuel plenum 52 from the manifold 50 and proceeds into the mini-fuel plenum 130 via fuel holes 56. Fuel then exits the mini-fuel plenum 130 and enters the venturi tube 34 through the fuel injection holes 146. When the fuel injection holes 146 are located between inlet region 40 and throat region 42, the fuel and air mixing within the venturi tube 34 is enhanced because greater fuel jet penetration and residence time for diffusion occurs before reaching the exit region 46 of the venturi tube 34. The mini-fuel plenum 130 allows fuel to be distributed into the venturi tube 34 via the fuel exit holes 146, and thus acts as an insulating space for the mechanical joint, a braze for example, between the upstream header plate 36 and the venturi body 70, thereby protecting the mechanical joint from the hot air flow 8 through the venturi tube 34 and associated thermal stresses, which increases the functional life of the multiple-venturi tube gas fuel injector 24.

Referring to FIGS. 4 and 5, a seal cavity 118 is formed between the sealing surface 115 and the mini-fuel plenum sealing surface 133. A resilient metallic seal (not shown) may be disposed within the seal cavity 118 to prevent fuel from leaking from the mini-fuel plenum 130 into the venturi tube 34. Seal cavity 118 allows for a thermal expansion of the venturi body 70 and venturi inlet shield 72 when operating temperatures are reached. When first and second threaded sections 112 and 142 are engaged, the sleeve 148 of the venturi inlet shield 72 extends from the mini-fuel plenum sealing ring 132, over the seal cavity 118, the sealing ring 116 and the front end portion 164 toward the second end 150. A trough 172 is formed between an exterior surface of the sleeve 148 of the venturi inlet shield 72 and an interior surface of the front end portion 164 of the venturi exit shield 74. The trough 172 acts as an insulating space, which reduces the thermal stresses in the mating joint 166 between the venturi body 70 and the venturi exit shield 74 by thermally protecting this joint from the hot air flow 8 through the venturi tube 34, thereby increasing the functional life of the multiple-venturi tube gas fuel injector 24 (see FIG. 1).

In an exemplary embodiment, referring now to FIGS. 1, 3 and 4, air 18 flows through preburner liner 16 and enters each venturi tube 34. Fuel is injected through gas supply line 54 into the fuel plenum 52. Because of the arrangement of the venturi tubes 34, space between contiguous venturi tubes is a consistent size and is also small due to the packed arrangement of each venturi tube 34. The small area formed between the upstream and downstream header plates 36 and 38 and the outside perimeter of each venturi tube 34 acts as the fuel plenum 52 by design. Fuel enters each venturi tube 34 by passing into the mini-fuel plenum 130 through fuel holes 56 and then passing through the fuel injection holes 146. Fuel then mixes with preburner exit flow in the venturi tube 34. Increased size of the gas fuel plenum 52 volume allows for a more consistent pressure supply of fuel to each fuel hole 56 and fuel injection hole 146 in the entire injector 24.

Referring again to FIGS. 4-6, the venturi tube 34 is constructed by inserting the venturi body 70 in a direction from the upstream header plate 36 to the downstream header plate 38. The venturi exit shield 74 is then inserted in a direction from the downstream header plate 38 to the upstream header plate 36 until the forward end 160 reaches the sealing ring aft surface 117. Attachment is then made between the venturi body 70 and the venturi exit shield 74 at the mating joint 166, between the venturi body 70 and upstream header plate 36, and between the venturi body 70 and downstream header plate 38. Each attachment, brazing for example, can be accomplished in a single step with the assembly of each of the venturi tubes 34 to the multi-venturi tube assembly 24 and then performing one braze cycle in a furnace thereby saving cost and time. The resilient metallic seal (not shown) is then disposed in the seal cavity 118 prior to installation of the venturi inlet shield 72. Venturi inlet shield 72 is then inserted to engage the first and second threaded sections 112 and 142. Venturi inlet shield 72 is then torqued into place via the torquing features 144.

The venturi inlet shield 72 may be easily removed to change the geometry and/or location of the fuel exit hole 146 if the user application of the combustor assembly 12 warrants such a change. Such a change can be done with minimal effort and does not require the replacement of the entire combustor assembly 12, which would be quite costly. The venturi exit shield 74 may also be removed for replacement, but requires some machining and re-brazing for installation of a replacement part.

Referring now to FIGS. 1-6, in operation, an air stream, at times accompanied by products of combustion of preburner section 14, pass from left to right in the FIG. 1, entering preburner section 14 and exiting reaction zone 30. A gas passing through a venturi tube 34 is accelerated to a maximum velocity at throat 42 and then is decelerated during its passage through exit diffuser 60. A gaseous fuel, injected through fuel exit holes 146 into the venturi tube 34, is subjected to high shear forces and turbulence, effective for producing substantial mixing of the fuel gas and air as it exits through exit diffuser 60.

In addition, while the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A gas fuel injector comprising:
a first header plate;
a second header plate spaced downstream from said first header plate; and
a plurality of venturi tubes sealably secured to said first and second header plates,
wherein each venturi tube of said plurality of venturi tubes is defined by a plurality of fixable components, wherein an attachment between a component of said plurality of fixable components and at least one of said first header plate, said second header plate, and another component of said plurality of fixable components is made via a thermally isolated mechanical joint.

2. The injector of claim 1, wherein said plurality of fixable components include a body section, an inlet shield, and an exit shield, the inlet shield and exit shield enclosing the body section.

3. The injector of claim 2, wherein said body section is sealably secured to said first header plate via a first thermally isolated mechanical joint and said body section is sealably secured to said second header plate via a second thermally isolated mechanical joint.

4. The injector of claim 2, wherein said body section is sealably secured to said exit shield by a third thermally isolated mechanical joint.

5. The injector of claim 2, wherein said body section is sealably secured to said inlet shield via a threaded engagement therebetween.

6. The injector of claim 5, wherein an expansion space is formed between said body section and said inlet section to allow for thermal expansion of said body section and said inlet section.

7. The injector of claim 2, wherein said attachment between said component of said plurality of fixable components and at least one of said first header plate, said second header plate, and another component of said plurality of fixable components forms a plurality of fuel chambers, and fuel enters said each venturi tube after passing through said plurality of fuel chambers.

8. The injector of claim 7, wherein said plurality of fuel chambers include at least a fuel plenum and a mini-fuel plenum.

9. The injector of claim 7, wherein each venturi tube includes an injection hole through which fuel enters said each venturi tube, said hole being disposed at a location between an inlet and a throat of said each venturi tube.

10. The injector of claim 1, wherein said thermally isolated mechanical joint is protected from a thermal stress by an insulating space being disposed between a hot fluid flow and a cold fluid flow in said each venturi tube.

11. The injector of claim 10, wherein said insulating space is formed between a portion of one of said plurality of fixable components and a portion of another of said plurality of fixable components.

12. The injector of claim 1, wherein said thermally isolated mechanical joint comprises a braze joint.

13. The injector of claim 1, comprising:
a first header plate;
a second header plate spaced downstream from said first header plate;
a plurality of venturi tubes sealably secured to said first and second header plates,
wherein each venturi tube of said plurality of venturi tubes is defined by a plurality of fixable components; and
wherein said plurality of fixable components include a body section, an inlet shield, and an exit shield, the inlet shield and exit shield enclosing the body section.

14. The injector of claim 13, wherein said body section is sealably secured to said first header plate via a first thermally isolated mechanical joint and said body section is sealably secured to said second header plate via a second thermally isolated mechanical joint.

15. A combustor for a gas turbine engine comprising:
a preburner; and
a fuel injector downstream of said preburner, said fuel injector includes,
a first header plate;
a second header plate spaced downstream from said first header plate; and
a plurality of venturi tubes arranged in rows and sealably secured to said first and second header plates,
wherein each venturi tube of said plurality of venturi tubes is defined by a plurality of fixable components, wherein an attachment between a component of said plurality of fixable components and at least one of said first header plate, said second header plate, and another component of said plurality of fixable components is made via a thermally isolated mechanical joint.

16. The combustor of claim 15, wherein said plurality of fixable components include an inlet shield, a body section, and an exit shield.

17. The combustor of claim 16, wherein said body section is sealably secured to said first header plate via a first thermally isolated mechanical joint, said body section is sealably secured to said second header plate via a second thermally isolated mechanical joint, and said body section is sealably secured to said exit shield by a third thermally isolated mechanical joint.

18. The combustor of claim 15, wherein said thermally isolated mechanical joint is protected from a thermal stress by an insulating space disposed between a hot fluid flow and a cold fluid flow in said each venturi tube.

19. The combustor of claim 18, wherein said insulating space is formed between a portion of one of said plurality of fixable components and a portion of another of said plurality of fixable components and an expansion space is formed between said body section and said inlet section to allow for thermal expansion of said body section and said inlet section.

20. The combustor of claim 15, wherein each venturi tube comprises a hole through which fuel enters said each venturi tube, said hole being disposed at a location between an inlet and a throat of said each venturi tube.

* * * * *